United States Patent
Vogt-Birnbrich et al.

(12)
(10) Patent No.: US 6,355,303 B1
(45) Date of Patent: Mar. 12, 2002

(54) PROCESS FOR THE PREPARATION OF MULTI-LAYER COATINGS OF THE WATER-BORNE BASE COAT/POWDER CLEAR COAT TYPE

(75) Inventors: Bettina Vogt-Birnbrich, Solingen; Armin Goebel, Wetter; Holger Schmidt, Wuppertal; Werner Bosch, Wuppertal; Frank Mueller, Wuppertal; Kornelia Wetzel, Wuppertal, all of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/560,750

(22) Filed: Apr. 28, 2000

(51) Int. Cl.[7] .................................................. B05D 1/12
(52) U.S. Cl. ...................... 427/195; 427/202; 427/409; 428/425.8; 428/480
(58) Field of Search ................................. 427/195, 202, 427/409, 410, 421, 470; 428/425.8, 450

(56) References Cited

U.S. PATENT DOCUMENTS 5,880,209 A 3/1999 Patzschke et al. .......... 524/541
6,129,989 A * 10/2000 Sapper

FOREIGN PATENT DOCUMENTS

| DE | 199 24 415.4 | 1/2001 |
| EP | 0069936 | 1/1983 |
| WO | WO-97/23306 A | * 7/1997 |
| WO | WO 97/49739 | 12/1997 |
| WO | WO-97/49739 A | * 12/1997 |

OTHER PUBLICATIONS

Research Disclosure #391043, Nov. 1996, abstract.*

* cited by examiner

Primary Examiner—Fred J. Parker
(74) Attorney, Agent, or Firm—Steven C. Benjamin

(57) ABSTRACT

A process for multi-layer coating by application of a base coat layer of a water-borne base coat to a substrate and subsequent application of a clear coat layer of a powder clear coat, followed by joint baking of both coating layers, wherein said water-borne base coat contains an effective amount, preferably 0.5 to 10 wt. %, of one or more water-insoluble cellulose esters, largely avoids the formation of blisters in the powder clear coat layer.

8 Claims, No Drawings

… … …
PROCESS FOR THE PREPARATION OF MULTI-LAYER COATINGS OF THE WATER-BORNE BASE COAT/POWDER CLEAR COAT TYPE

FIELD OF THE INVENTION

The invention relates to a process for the preparation of multi-layer coatings of the water-borne base coat/powder clear coat type.

BACKGROUND OF THE INVENTION

In the automotive coating sector environmentally friendly, low-solvent coating processes are becoming increasingly established. A process which causes particularly low solvent emissions is the preparation of colour- and/or effect-imparting base coat/clear coat two-layer coatings of water-borne base coat and powder clear coat. A problem during the preparation of such water-borne base coat/powder clear coat two-layer coatings is the formation of optically troublesome inclusions of gas bubbles in the powder clear coat layer and burst gas bubbles discernable in the powder clear coat surface as pinholes, hereinafter collectively referred to as blisters.

SUMMARY OF THE INVENTION

The present invention solves this problem by the process for multi-layer coating of a substrate, comprising forming a base coat layer of a water-borne base coat on said substrate, applying a clear coat layer of a powder clear coat on said base coat layer, and jointly baking both layers, said water-borne base coat containing an effective amount of at least one water-insoluble cellulose ester to reduce blistering in said clear coat layer during said joint baking.

The base coat layer is formed on the substrate by applying the water-borne base coat to the substrate and drying the resultant wet layer. The water-borne base coat contains resin solids which include one or more binder resins. Preferably, the amount of water-insoluble cellulose ester present in the water-borne base coat is 0.5 to 10 wt %, based on the resin solids in the water-borne base coat.

The blistering problem described above arises with increasing thickness of the base coat layer and/or of the clear coat layer, which thickness arises either from the need for a thick coat to produce the desired coating effect or from thin coat(s) which inevitably become thick in certain areas during application because of the shape of the substrate being multi-layer coated. The process of the present invention enables relatively thick base coat and clear coat layers to be formed without blistering, as compared to when the water-insoluble cellulose ester is not present in the water-borne base coat.

DETAILED DESCRIPTION OF THE EMBODIMENTS

The water-borne base coats used in the process according to the invention contain anionically and/or nonionically stabilised binder resin. Anionic stabilisation is achieved preferably by means of at least partially neutralised carboxyl groups in the binder resin, whereas nonionic stabilisation is achieved preferably by means of lateral and/or terminal polyethylene oxide units in the binder resin. Carboxyl groups are contained in the binder resin, for example, equivalent to an acid value from 5 to 40mg KOH/g of solid resin. The water-borne base coats may be of a physically drying nature or cross-linkable with the formation of covalent bonds. The water-borne base coats cross-linking with the formation of covalent bonds may be self- or externally cross-linking systems. In the latter case they may be one- or multi-component water-borne base coats.

Neither the binder resin contained in the water-borne base coat(s) nor the optionally contained cross-linking agents are subject to any restriction. The film-forming binder resin includes at least one film-forming, water-dilutable resin (water soluble or water dispersible) for water-borne base coats, well known to the skilled person, such as water-dilutable polyester resin, (meth)acrylic copolymer resin, polyurethane resin, (meth)acrylated polyester resin and/or (meth)acrylated polyurethane resin. Each of these resins can be present as a plurality of resins, e.g. a combination of polyester resins, or as a combination among the different resins, e.g. polyurethane resin and (meth)acrylated polyurethane. The (meth)acrylated polyester resins or (meth)acrylated polyurethane resins are binders in which (meth)acrylic copolymer and polyester resin or (meth)acrylic copolymer and polyurethane resin are linked together by covalent bonding and/or in the form of interpenetrating resin molecules. The preparation of the above-mentioned binders is well known to the skilled person and may be derived, for example, from the extensive patent literature in the field of water-borne base coats and water-borne base coat binders and does not, therefore, require any further explanation. Water-dilutable polyurethane resins and/or water-dilutable (meth)acrylated polyurethane resins preferably account for a proportion from 10 to 100 wt. % of the resin solid content of the water-borne base coats.

The water-dilutable binders may be non-functional or reactive resins having, for example, hydroxyl functions corresponding to a hydroxyl value from 20 to 140 mg KOH/g solid resin. Examples of cross-linking agents which may be contained include amine-formaldehyde condensation resins, e.g., melamine resins, and free or blocked polyisocyanates. If cross-linking agents are present, the mixing ratio of cross-linking agents to binders is preferably 10:90 to 40:60, particularly preferably 20:80 to 30:70, in each case based on the solids weight.

The water-borne base coats may also contain paste resins. Paste resins are used to grind pigments and may therefore be introduced into the water-borne base coats by means of pigment pastes.

The resin solids of the water-borne base coats are composed of the sum of the solids contributions of the binder resins, the optionally present cross-linking agents and the optionally present paste resins. If the binder resin is water soluble, it is nevertheless counted as a resin solid, because it becomes solid in the layer formed from the base coat. The proportion of the solids content of the water-borne base coats formed by water-insoluble cellulose esters is not counted as belonging to the resin solid content.

Most preferably, the water-borne base coats contain 0.5 to 7 wt % of at least one water-insoluble cellulose ester, based on their resin solid content. The water-insoluble cellulose esters are, for example, cellulose acetopropionate or cellulose acetobutyrate, which are both sold commercially, for example, by the company Eastman, in various water-insoluble variants with different hydroxyl, acetyl and propionyl or butyryl contents. Cellulose acetobutyrate is preferred, particularly with high butyryl contents from 35 to 55 wt. % based on the weight of the cellulose ester.

The water-insoluble cellulose ester is preferably introduced into the water-borne base coat by means of one or more water-dilutable binder resins, i.e. as a pre-mixture therewith. For example, the above-mentioned water-dilutable polyester resins, (meth)acrylic copolymer resins, (meth)acrylated polyester resins, polyurethane resins and/or (meth)acrylated polyurethane resins are suitable and can be used for this purpose. Water-dilutable polyurethane resins and (meth)acrylated polyurethane resins are particularly preferred. In order to introduce the water-insoluble cellulose esters into the water-borne base coats, the binder resins are mixed, before adding substantial amounts of water, with an appropriate amount of water-insoluble cellulose ester, for example, in a binder:water-insoluble cellulose ester solids weight ratio from 99.5:0.5 to 60:40 and then converted to the disperse phase by adding water, optionally followed by mixing with additional binder resin to obtain the proportion of celluose ester desired. If the water-insoluble cellulose esters are insufficiently miscible with the binders still present in the water-free form or insufficiently soluble therein, it is expedient to mix the water-insoluble cellulose esters in the form of an organic solution with the binder resin still present in the water-free form. Examples of organic solutions of the water-insoluble cellulose esters which may be used include those containing from 20 to 60 wt. % of cellulose esters in polar organic, preferably water-miscible solvents. Examples of suitable solvents are esters, glycol ethers, glycol ether esters, glycol esters, ketones, N-alkylpyrrolidones. Butyl glycol and N-methylpyrrolidone are preferred. If desired, the solvent(s) may be partially or wholly removed after the formation of the dispersion, for example, by distillation optionally under reduced pressure.

It is expedient if the addition and mixing with water-insoluble cellulose ester takes place in a suitable stage of the process before the addition of substantial amounts of water. For example, before or after the binder synthesis has been completed, an appropriate amount of water-insoluble cellulose ester may be added to the binder resin and homogeneously mixed therewith before the addition of substantial amounts of water for the purpose of forming a dispersion. Operations should be carried out in such a way that unwanted side reactions, for example, of the water-insoluble cellulose ester with other constituents of the (reaction) mixture are excluded. For example, gel formation in particular should be avoided.

Water-dilutable binder resins containing water-insoluble cellulose esters and water-borne base coats containing such binders are well known, for example, from EP-A-0 069 936, WO 97/49739 and from German patent application DE 199 24 415.4. None of said literature references describes a coating over of water-borne base coat layers with powder clear coats whereby the problem of blistering addressed by the present invention is not mentioned in the literature references.

EP-A-0 069 936 describes aqueous dispersions of cellulose esters suitable as water-borne base coat binders which are prepared by copolymerisation of a mixture of a water-soluble resin from the group comprising polyester resins, acrylic resins and alkyd resins and alpha,beta-ethylenically unsaturated monomers in the presence of the dissolved cellulose esters, wherein the cellulose ester content, based on the total solids content of the dispersion, is from 5 to 40 wt. %. WO 97/49739 describes aqueous dispersions based on vinyl polymers suitable as water-borne base coat binders which are prepared by copolymerisation of aqueous emulsions, prepared beforehand, of cellulose ester dissolved in a mixture of vinyl monomers with a cellulose ester content from 5 to 40 wt. %, based on the resin solids of the dispersion. The water-borne base coat binders and coating agents known from EP-A-0 069 936 and WO 97/49739 may be used for the purpose of the present invention.

It is particularly preferable to introduce one or more of the water-insoluble cellulose esters into the water-borne base coats used in the process according to the invention by means of water-dilutable polyurethane resins which may be (meth)acrylated as described in German patent application DE 199 24 415.4 and in the Examples herein. The water-dilutable, optionally (meth)acrylated polyurethane resins described therein are aqueous dispersions of optionally (meth)acrylated polyurethane resins containing water-insoluble cellulose esters. The aqueous dispersions of polyurethane resins which may be (meth)acrylated are either dispersions of polyurethane resins (A) which are mixed with an appropriate amount of water-insoluble cellulose ester in each case before the addition of substantial amounts of water and are then converted to the disperse phase by adding water, or dispersions of (meth)acrylated polyurethane resins (B) which, before or after (meth)acrylation but in each case before the addition of substantial amounts of water, are mixed with an appropriate amount of water-insoluble cellulose ester and then converted to the disperse phase by adding water. The dispersions of (meth)acrylated polyurethane resins (B) may be prepared by (meth)acrylating the polyurethane resins in the nonaqueous phase, mixing them with an appropriate amount of water-insoluble cellulose ester, and then converting them to the disperse phase by adding water, or by mixing them in the non-aqueous phase with an appropriate amount of water-insoluble cellulose ester then (meth)acrylating them and then converting them to the disperse phase by adding water. Preferably, however, the polyurethane resins are mixed in the non-aqueous phase with an appropriate amount of water-insoluble cellulose ester, then converted to the disperse phase by adding substantial amounts of water and then (meth)acrylated in the aqueous dispersion. The terms "(meth)acrylation" or "(meth)acrylated" means that free-radical polymerization of (meth)acrylically unsaturated monomer is carried out in the presence of the binder resin to be (meth)acrylated. For example, for the preparation of the (meth)acrylated polyurethane resins (B), free-radical polymerisation of (meth)acrylically unsaturated monomers is carried out in the presence of polyurethane resins, for example, polyurethane resins (A).

If the water-insoluble cellulose esters are insufficiently miscible with the polyurethane resins (A) still present in the water-free form or with the polyurethane resins still present in the water-free form and to be (meth)acrylated or insufficiently soluble therein, it is expedient to mix the water-insoluble cellulose esters as explained above in the form of an organic solution with the polyurethane resins. In the case of polyurethane resins to be (meth)acrylated, it may also be expedient to use a part or the entire amount of the olefinically unsaturated monomers used for (meth)acrylation as solvent for the water-insoluble cellulose esters. The olefinically unsaturated monomers may be used as the only solvent or in mixture with organic solvents.

The polyurethane resins (A) are, for example, isocyanate group-free, carboxyl-functional polyurethane resins, preferably carboxyl-functional polyurethane prepolymers chain-extended in any manner to polyurethane resins, which are mixed with an appropriate amount of water-insoluble cellulose ester, in each case before the addition of substantial amounts of water for the purpose of conversion to the disperse phase. Examples of chain extension reactions are the chain extension of isocyanate-functional polyurethane prepolymers with polyols, polyamines and/or water or the chain extension of alkoxy silane-functional polyurethane prepolymers with water with the formation of siloxane bridges.

The (meth)acrylated polyurethane resins (B) are carboxyl-functional polyurethane/poly(meth)acrylate hybrid polymers with a polyurethane:poly(meth)acrylate weight ratio of, for example, 0.05:1 to 50:1. They may be prepared, for example, by free-radical polymerisation of (meth) acrylically and optionally other olefinically unsaturated monomers in the presence of carboxyl-functional polyurethane resins, preferably in the presence of carboxyl-functional polyurethane resins in aqueous dispersion. The carboxyl-functional polyurethane resins to be (meth) acrylated may or may not contain olefinic double bonds. Examples of polyurethane resins to be (meth)acrylated which may be used include polyurethane resins of type (A).

The binders contained in the water-borne base coats are composed either exclusively of binder resin containing water-insoluble cellulose esters or of a combination of binder resins containing water-insoluble cellulose esters with binder resin(s) free from water-insoluble cellulose esters. In both cases, it is preferred for the invention that the water-insoluble cellulose ester content of the water-borne base coats is 0.5 to 10 wt. %, based on their resin solid content.

The water-borne base coats can contain one or more inorganic and/or organic colour- and/or effect-imparting pigments and optionally one or more fillers.

Examples of colour-imparting pigments and fillers are titanium dioxide, micronised titanium dioxide, iron oxide pigments, carbon black, silica, barium sulfate, micronised mica, talc, kaolin, chalk, azo pigments, phthalocyanine pigments, quinacridone pigments, pyrrolopyrrole pigments, perylene pigments. Examples of metallic effect pigments are the conventional metallic pigments well known for this purpose to the skilled person, e.g., of aluminium, copper or other metals. Examples of special effect-imparting pigments, in addition to the metallic effect pigments, are interference pigments such as, e.g., metal oxide-coated metal pigments, e.g., titanium dioxide-coated aluminium, coated mica such as, e.g., titanium dioxide-coated mica and graphite-like effect-giving pigments.

The effect pigments are generally provided in the form of a commercial aqueous or non-aqueous paste, to which preferably water-dilutable organic solvents and additives may be added, and then mixed with aqueous binder resin. Effect pigments in powder (plate-like particle structure) form may be processed initially with preferably water-dilutable organic solvents and additives to a paste. Coloured pigments and/or fillers may be ground, for example, in a part of the aqueous binder resin. Grinding may also take place preferably in a water-dilutable paste resin. The paste may then be completed with the remaining proportion of the aqueous binder or of the aqueous paste resin to obtain the coloured pigment paste.

Moreover, the water-borne base coats may contain coatings additives in conventional amounts for coatings, for example, from 0.1 to 5 wt. %, based on their solid content, for example, rheology-influencing agents such as fine-particle silica, inorganic layered silicates, cross-linked or non-cross-linked polymer microparticles, polymeric urea compounds, water-soluble cellulose ethers or synthetic polymers with ionic and/or groups with an associative effect; anti-settling agents; levelling agents; light protecting agents; catalysts; antifoaming agents; wetting agents; adhesion promoting agents; neutralising agents.

The proportion of organic solvents in the water-borne base coats used in the process according to the invention may be, for example, from 5 to 30 wt. % based on the total weight of the base coat. These are conventional coatings solvents which may originate from the preparation of the binders or added separately. Examples of such solvents are mono- or polyhydric alcohols, e.g., propanol, butanol, hexanol; glycol ethers or esters, e.g., diethylene glycol dialkyl ether, dipropylene glycol dialkyl ether, in each case with C1 to C6 alkyl, ethoxypropanol, butylglycol; glycols, e.g., ethylene glycol, propylene glycol, and oligomers thereof, N-alkylpyrrolidones such as, e.g., N-methylpyrrolidone and ketones such as methyl ethyl ketone, acetone, cyclohexanone; aromatic or aliphatic hydrocarbons.

In order to prepare the water-borne base coats, pigments, for example, are mixed with the water-dilutable binder(s) containing water-insoluble cellulose esters and optionally with water-dilutable binders free from water-insoluble cellulose esters, cross-linking agents, fillers, conventional coating additives and organic solvents, wherein the water-insoluble cellulose ester content to be obtained in the water-borne base coats is an effective amount to reduce blisters during joint baking of the base coat/powder clear coat, preferably from 0.5 to 10 wt. %, based on the resin solid content in the water-borne base coat.

The water-borne base coats have, for example, solids contents from 10 to 50 wt. %; for effect pigment-containing water-borne base coats it is, for example, preferably 15 to 30 wt. %; for single-colour water-borne base coats, it is preferably higher, for example, 20 to 45 wt. %. The weight ratio of pigment to binder resin in the water-borne base coats is, for example, from 0.05:1 to 3:1, for effect water-borne base coats it is, for example, preferably 0.1:1 to 0.6:1, for single-colour water-borne base coats it is preferably higher, for example, 0.1:1 to 2.5:1, in each case based on the solids weight. When calculating the solids contents and ratio of pigment to binder, the sum of the proportions by weight of colour-imparting pigments, effect pigments and fillers is brought into relation with the resin solids.

In the process according to the invention, powder clear coats known as such are used to prepare the powder clear coat layer. The powder clear coats contain suitable binder/cross-linking agent combinations known as such for the preparation of clear coat layers. For example, these are combinations of at least one hydroxy-functional binder, particularly hydroxy-functional (meth)acrylic copolymers with blocked polyisocyanate hardeners (crosslinkers) or at least one epoxy-functional binder, particularly epoxy-functional (meth)acrylic copolymers, with carboxyl- and/or carboxylic anhydride-functional hardeners (crosslinkers) and/or tris(alkoxycarbonylamino) triazine hardeners (crosslinkers).

Preferred examples for the combinations of epoxy-functional (meth)acrylic copolymers with acid, more particularly carboxyl- and/or carboxylic anhydride-functional hardeners are those which contain, as binder, glycidyl(meth) acrylic copolymers with an epoxy equivalent weight from 250 to 1000 and, as hardener, one or more low molecular weight or polymer compounds with an average of two or more carboxyl functions per molecule and/or anhydrides thereof, wherein the epoxy groups of the glycidyl(meth) acrylic copolymers are present in a ratio from 1.5:1 to 1:1.5 to the free carboxyl functions and/or carboxyl functions latently bound as anhydride. The glycidyl(meth)acrylic copolymers have an epoxy equivalent weight from 250 to 1000, preferably from 300 to 600, particularly preferably from 300 to 450. The glycidyl(meth)acrylic copolymers have, for example, glass transition temperatures from 30° C. to 120° C., preferably from 30° C to 90° C., and their number average molecular masses (Mn) are, for example, from 1000 to 10,000, preferably from 1000 to 5000.

Apart from glycidyl acrylate and/or glycidyl methacrylate corresponding to an epoxy equivalent weight from 250 to 1000, the glycidyl(meth)acrylic copolymers contain one or more comonomers, the selection of which by the skilled person is generally made from olefinically unsaturated monomers without other functional groups, according to the desired properties of the copolymer. Examples of such comonomers are monovinyl aromatic compounds such as styrene; vinyl esters of aliphatic carboxylic acids such as, e.g., vinyl acetate, vinyl versatate; vinyl ethers; (meth) acrylonitrile; (meth)acrylamide; but more particularly (cyclo)alkyl(meth)acrylates with 1 to 18 carbon atoms in the (cyclo)alkyl part.

The glycidyl(meth)acrylate copolymers may be prepared in a manner known to the skilled person by free-radical copolymerisation, particularly by solution or bulk polymerisation.

The hardeners (crosslinkers) are one or more low molecular weight or polymer compounds with an average of two or more, preferably two carboxyl functions per molecule and/ or anhydrides thereof The anhydride groups are latently bound carboxyl groups, where each anhydride group is to be counted as a carboxyl group. Examples of carboxyl-functional hardeners are solid aliphatic dicarboxylic acids and—where they exist—the intramolecular anhydrides thereof, 1,12-dodecane dicarboxylic acid being particularly preferred. Solid dicarboxylic acid polyanhydrides with weight average molecular masses (Mw) from, for example, 1000 to 5000, may also be used, for example, 1,12-dodecane dicarboxylic (poly)anhydride. Further examples of carboxyl-functional hardeners are carboxyl-functional polymers such as, e.g., polyesters, polyurethanes, (meth)acrylic copolymers, carboxyl-functional oligourethanes, carboxyl-functional oligoesters.

The quantity ratio of glycidyl(meth)acrylic copolymers and carboxylic (anhydride) hardeners in the powder clear coats is selected in such a way that a stoichiometric ratio of epoxide groups of the glycidyl(meth)acrylic copolymers to the free carboxyl functions of the hardener or those latently bound as the anhydride is from 1.5:1 to 1:1.5, preferably 1.2:1 to 1:1.2. For example, weight ratios, totalling 100 wt. %, from 60 to 90 wt. % of glycidyl(meth)acrylic copolymer to 10 to 40 wt. % of carboxyl- and optionally anhydride-functional hardener component are present.

The powder clear coats may contain conventional powder clear coat additives in conventional amounts, for example, from 0.1 to 5 wt. %, such as, for example, levelling agents, degassing agents, antioxidants, light protecting agents, bonding agents, catalysts and rheology-controlling agents.

The powder clear coats may also contain colourless pigments, e.g., micronised titanium dioxide, aluminium oxide or silica.

The preparation of the powder clear coats is carried out preferably by extruding the powder clear coat ready formulated by dry mixing of all the components required in the form of a paste-like melt, cooling the melt, coarse comminution, fine grinding followed by sieving to the desired particle fineness, for example, to average particle sizes from 20 to 90 μm, preferably from 30 to 70 μm.

The base coat/powder clear coat two-layer coatings prepared according to the invention are colour- and/or effect-imparting multi-layer coatings. They are prepared using the water-borne base coats and powder clear coats described above. The water-borne base coats may be applied by conventional methods. They are applied preferably by spraying in a dry film thickness from 8 to 40 μm. Application takes place preferably in the dry-in-wet process, i.e., the base coat layer is dried to the extent desired such as by flashing-off, e.g., at 20° C. to 80° C., and is then coated over with the powder clear coat in a dry film thickness from preferably 30 to 80 μm and baked together at temperatures from, for example, 120° C. to 160° C.

Two-layer coatings prepared according to the process of the invention may be applied to various types of substrates, bare or precoated such as with primer. Generally, they are metallic or heat stable plastic substrates. These are often precoated, i.e., plastic substrates may be provided, e.g., with a plastics primer; metallic substrates generally have an electrophoretically applied primer, and optionally in addition one or more further coating layers, such as, e.g., a primer surfacer layer. Said layers are generally cured.

Surprisingly, the water-borne base coat/powder clear coat two-layer coatings prepared according to the process of the invention, in comparison with water-borne base coat/powder clear coat two-layer coatings prepared using a water-borne base coat free from water-insoluble cellulose esters, are characterised by a more favourable behaviour in terms of the development of blisters in the powder clear coat layer, i.e. the development of blisters in the clear coat layer during joint baking with the base coat layer is either reduced or eliminated. This leads to a higher process reliability in the production of water-borne base coat/powder clear coat two-layer coatings.

The process according to the invention is particularly suitable for use in the automotive sector in the preparation of water-borne base coat/powder clear coat two-layer coatings on motor vehicle bodies and parts thereof.

EXAMPLES

Example 1

An aqueous polyurethane dispersion was prepared:

1005 g of a straight-chain polyester (composed of adipic acid, isophthalic acid and hexane diol with an OH value of 102 mg KOH/g) were heated to 90° C. and 1.8 g of trimethylolpropane and 393 g of isophorone diisocyanate were added. The reaction was carried out at 90° C. until the NCO value was 3.8. After cooling to 60° C., a solution of 35.3 g of dimethylol propionic acid, 26.1 g of triethylamine and 250 g of N-methylpyrrolidone was added. After heating to 80° C., the reaction temperature was maintained until an NCO value of 1.5 was reached. The reaction mixture was mixed with the stoichiometrically required amount of deionised water for chain extension, and the solution was kept at 80° C. until no more NCO was detectable. The batch was then converted to an aqueous dispersion with a solids content of 35 wt. % by adding deionised water.

Example 2

An aqueous dispersion of a methacrylated polyurethane resin was prepared:

145.4 g of a polyester of adipic acid, neopentyl glycol and isophthalic acid (hydroxyl value: 109 mg KOH/g) and 8.0 g of dimethylol propionic acid were dissolved in 69.6 g of N-methylpyrrolidone and heated to 40° C. 55.8 g of isophorone diisocyanate were then added in such a way that a reaction temperature of 80° C. was not exceeded. The reaction temperature was maintained until an NCO content of 2% (based on solid resin and determined according to DIN 53185) was reached. Then 3.3 g of diethanolamine, 12.2 g of dodecanol and 2.0 g of hydroxyethylmethacrylate were added successively. The reaction mixture was kept at 80° C. until no more free NCO groups were detectable (titration). Then 128.0 g of methylmethacrylate were added. 5.4 g of triethylamine and 5.4 g of deionised water were added and incorporated thoroughly. After the addition of 864.0 g of deionised water, a fine-particle aqueous dispersion was obtained. 250.0 g of butylacrylate, 125.0 g of tert.-butylacrylate and a solution of 62.0 g of deionised water and 2.0 g of ammonium peroxodisulfate were then added continuously at 80° C. over a period of 2 h. The dispersion was then kept at 80° C. for 3 h and adjusted to a solids content of 30 wt. % with deionised water.

Example 3

An aqueous dispersion of a methacrylated polyurethane resin containing a water-insoluble cellulose ester (4 wt % based on the weight of the methacrylated polyurethane) was prepared:

Example 2 was repeated except that, instead of 128.0 g of methylmethacrylate, a solution of 29 g of cellulose acetobutyrate (acetyl content 2 wt. %, butyryl content 52 wt. %) in 128 g of methylmethacrylate was added and mixed homogeneously.

The weight % of the cellulose ester can be increased or decreased by increasing or decreasing, respectively the amount of the cellulose ester present during the reaction forming the methacrylated polyurethane. This can be done in a range of 0.5 to 15 wt-% cellulose ester content based on the weight of the methacrylated polyurethane.

Example 4

An aluminium paste was prepared (parts are by weight):

20.5 g of a commercial aluminium paste (Hydrolac WH 16nl of the company Eckart-Werke, aluminium content 65 wt. %) were stirred thoroughly with a mixture of 7.0 g of butoxy ethanol and 14.0 g of deionised water. 4.0 g of the binder dispersion from Example 1 and 6.0 g of the binder dispersion from Example 2, 10.0 g of butoxy ethanol, 34.7 g of deionised water and 3.0 g of a commercial polyacrylic acid thickener (8% by weight aqueous solution of Viscalex HV 30 from the company Allied Colloids) were then added. The pH was adjusted to 6.3 with dimethyl ethanolamine.

Example 5

An aqueous layered silicate dispersion was prepared (parts are by weight):

3 parts of a layered silicate (Optigel SH from the company Südchemie) were added to a prepared mixture of 40 parts of deionised water and 10 parts of butyl glycol, and dispersed under the dissolver at maximum power level. 40 parts of hexamethoxy methylmelamine and 7 parts of deionised water were then mixed in homogeneously.

Example 6

A water-borne base coat (green metallic) was prepared (parts are by weight) by homogeneously mixing the constituents below:

14 parts of the 35 wt. % aqueous polyurethane dispersion from Example 1, 26 parts of the 30 wt. % aqueous dispersion of a methacrylated polyurethane resin from Example 2, 24 parts of deionised water, 8 parts of a commercial polyacrylic acid thickener (8% by weight aqueous solution of Viscalex HV 30 from the company Allied Colloids, adjusted to pH 7.5 with dimethyl ethanolamine), 5 parts of a 26.5 wt. % aqueous green pigment paste (pigment content 20 wt. % of a chlorinated phthalocyanine pigment, 6.5 wt. % paste resin solids according to paste forming resin example 1 of U.S. Pat. No. 5,880,209), 4 parts of the aluminium paste from Example 4, 3 parts of the aqueous layered silicate dispersion from Example 5, 9 parts of butyl glycol, 0.5 parts of a commercial defoamer (Surfynol 104 from the company Air Products), 1 part of polypropylene glycol (hydroxyl value 125 mg KOH/g)

5.5 parts of deionised water.

Example 7

Example 6 was repeated except that, instead of 26 parts by weight of the aqueous dispersion of the methacrylated polyurethane resin from Example 2, 26 parts by weight of the aqueous dispersion of the methacrylated polyurethane resin from Example 3 containing a water-insoluble cellulose ester were used.

Example 8

A powder clear coat was prepared:

729 g of an epoxy-functional methacryl copolymer with an epoxy-weight equivalent of 380 and an average molecular weight (Mn) of 2000, 210 g 1.12-dodecandiacid, 30 g of a light protecting agent (1:1-mixture of Tinuvin® 900 (UV-absorber) and Tinuvin® 111 (sterically hindered amine light protecting agent), both from the company Ciba), 3 g benzoin, 6 g of Irganox® B 225 (antioxidant) from the company Ciba and 8 g of Troy® EX 570 (leveling agent) from the company Troy Chemie were first mixed in a dry state and then dispersed at 100 to 120° C. by means of an extruder. After cooling off and pre-comminuting of the extrudate the latter was milled in an air separation ball mill to an average particle size ($d_{50}$) of 20 μm to a powder clear coat.

Preparation of base coat/clear coat two-layer coatings

Example 9 (Comparative Example)

The water-borne base coat from Example 6 was applied to a conventional phosphated auto body sheet precoated by cathodic electrodeposition and with primer surfacer by spraying in a dry film thickness of 15 m. After application, the coating was dried by flashing off at room temperature for 10 minutes, followed by additional heating for 10 minutes at 80° C. It was then coated over with the powder clear coat from Example 8 in a wedge shape in a dry film thickness increasing from 10 μm to 200 μm and baked for 30 minutes at 145° C. (object temperature). Blisters were visually discernable from a powder clear coat film thickness of 55 μm upwards.

Example 10

Example 9 was repeated in a similar manner with the water-borne base coat from Example 7. Blisters were visually discernable from a powder clear coat film thickness of 85 μm upwards.

Example 11 (Comparative Example)

The water-borne base coat from Example 6 was applied to a conventional phosphated auto body sheet precoated by cathodic electrodeposition and with primer surfacer by spraying in a wedge shape in a dry film thickness increasing from 15 μm to 50 μm. After application, the coating was dried by flashing off at room temperature for 10 minutes, followed by additional heating for 10 minutes at 80° C. It was then coated over with the powder clear coat from Example 8 in a dry film thickness of 70 μm and baked for 30 minutes at 145° C. (object temperature). Blisters were visually discernable from a base coat film thickness of 15 μm upwards.

Example 12

Example 11 was repeated in a similar manner with the water-borne base coat from Example 7. Blisters were visually discernable from a base coat film thickness of 30 μm upwards.

What is claimed is:

1. A process for multi-layer coating of a substrate, comprising forming a base coat layer of a water-borne base coat on said substrate, applying a clear coat layer of a powder clear coat to said base coat layer, and jointly baking both coating layers, said water-borne base coat comprising a water-dilutable resin selected from the group consisting of polyester resin, (meth)acrylic copolymer resin, polyurethane resin, (meth)acrylated polyester resin, (meth)acrylated polyurethane resin and combinations thereof and blended with 0.5 to 10 wt %, based on the weight of resin solids in the base coat, of at least one water-insoluble cellulose ester to reduce blistering in said clear coat layer during said joint baking, compared to a water-bourne base coat free of said at least one water-insoluble cellulose ether.

2. A process according to claim 1, wherein said water-insoluble cellulose ester is cellulose acetopropionate or cellulose acetobutyrate.

3. A process according to claim 2, wherein said cellulose acetobutyrate has a butyryl content from 35 to 55 wt. %.

4. A process according to claim 1, wherein said water dilutable resin is polyurethane resin, (meth)acrylated polyurethane resin or a combination thereof.

5. A process according to claim 1, wherein said water-borne base coat contains at least one water-dilutable resin and said water-insoluble cellulose ester is introduced into said water-borne base coat as a pre-mixture with said water-dilutable resin.

6. A process according to claim 1, wherein said powder clear coat comprises at least one binder/cross-linking agent combination selected from the group consisting of:

(a) hydroxy-functional binder with blocked polyisocyanate and (b) epoxy-functional binder with
   (i) carboxylic acid functional curing agent;
   (ii) carboxylic acid anhydride functional curing agent;
   (iii) tris(alkoxycarbonylamino)triazine curing agent; and
   (iv) combinations of (i)–(iii).

7. A coated substrate coated by the process of claim 1.

8. The coated substrate of claim 7 in the form of a motor vehicle body or body part.

* * * * *

UNITED STATES PATENT AND TRADEMARK OFFICE
CERTIFICATE OF CORRECTION

PATENT NO. : 6,355,303 B1  
DATED : March 12, 2002  
INVENTOR(S) : Betinna Vogt-Birnbrich, Armin Gobel, Holger Schmidt, Werner Bosch, Frank Mueller and Kornelia Wetzel It is certified that error appears in the above-identified patent and that said Letters Patent is hereby corrected as shown below:

<u>Column 10,</u>
Line 49, replace "15m" with -- 15 μm --.

Signed and Sealed this

Fourth Day of June, 2002

*Attest:*

JAMES E. ROGAN
*Attesting Officer*   *Director of the United States Patent and Trademark Office*